(12) United States Patent
Imai

(10) Patent No.: US 12,452,045 B2
(45) Date of Patent: Oct. 21, 2025

(54) COMMUNICATION CONTROL TECHNIQUES IN QUANTUM CRYPTOGRAPHIC COMMUNICATION SYSTEM

(71) Applicant: NEC Corporation, Tokyo (JP)

(72) Inventor: Hiroshi Imai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 163 days.

(21) Appl. No.: 18/227,262

(22) Filed: Jul. 27, 2023

(65) Prior Publication Data

US 2024/0106635 A1 Mar. 28, 2024

(30) Foreign Application Priority Data

Sep. 28, 2022 (JP) ................. 2022-155038

(51) Int. Cl.
*H04B 10/00* (2013.01)
*H04B 10/112* (2013.01)
*H04B 10/70* (2013.01)
*H04L 9/08* (2006.01)
*H04J 14/00* (2006.01)

(52) U.S. Cl.
CPC ........ *H04L 9/0852* (2013.01); *H04B 10/1121* (2013.01); *H04B 10/70* (2013.01)

(58) Field of Classification Search
CPC ............ H04B 10/0775; H04B 10/0777; H04B 10/672; H04B 10/673; H04B 10/70
See application file for complete search history.

(56) References Cited

U.S. PATENT DOCUMENTS

| 2007/0248229 A1 | 10/2007 | Kawamoto et al. |
| 2017/0126316 A1 | 5/2017 | Yuan et al. |
| 2020/0044750 A1 | 2/2020 | Cai et al. |
| 2021/0266142 A1* | 8/2021 | Kuang ................. H04B 10/556 |
| 2023/0188544 A1* | 6/2023 | Hunt ..................... H04L 9/0852 726/23 |

FOREIGN PATENT DOCUMENTS

| JP | 2000-101570 A | 4/2000 |
| JP | 2007-266738 A | 10/2007 |

OTHER PUBLICATIONS

Extended European Search Report for EP Application No. 23199317.1, dated on Feb. 15, 2024.

* cited by examiner

*Primary Examiner* — Daniel G Dobson

(57) ABSTRACT

A communication device can achieve SN ratio and stability of signal output an optical transmission line having the propagation characteristics susceptible to environmental changes. The communication device includes: an optical reception section configured to receive weak signal light and reference light arriving through the optical transmission line; an optical amplifier that amplifies received reference light; a probe light receiver that receives probe light arriving from the transmitting-side communication device through the optical transmission line; and a controller configured to calculate a transmission line state detected based on received probe light and control a gain of the optical amplifier according to the transmission line state.

16 Claims, 12 Drawing Sheets

FIRST EXAMPLE EMBODIMENT

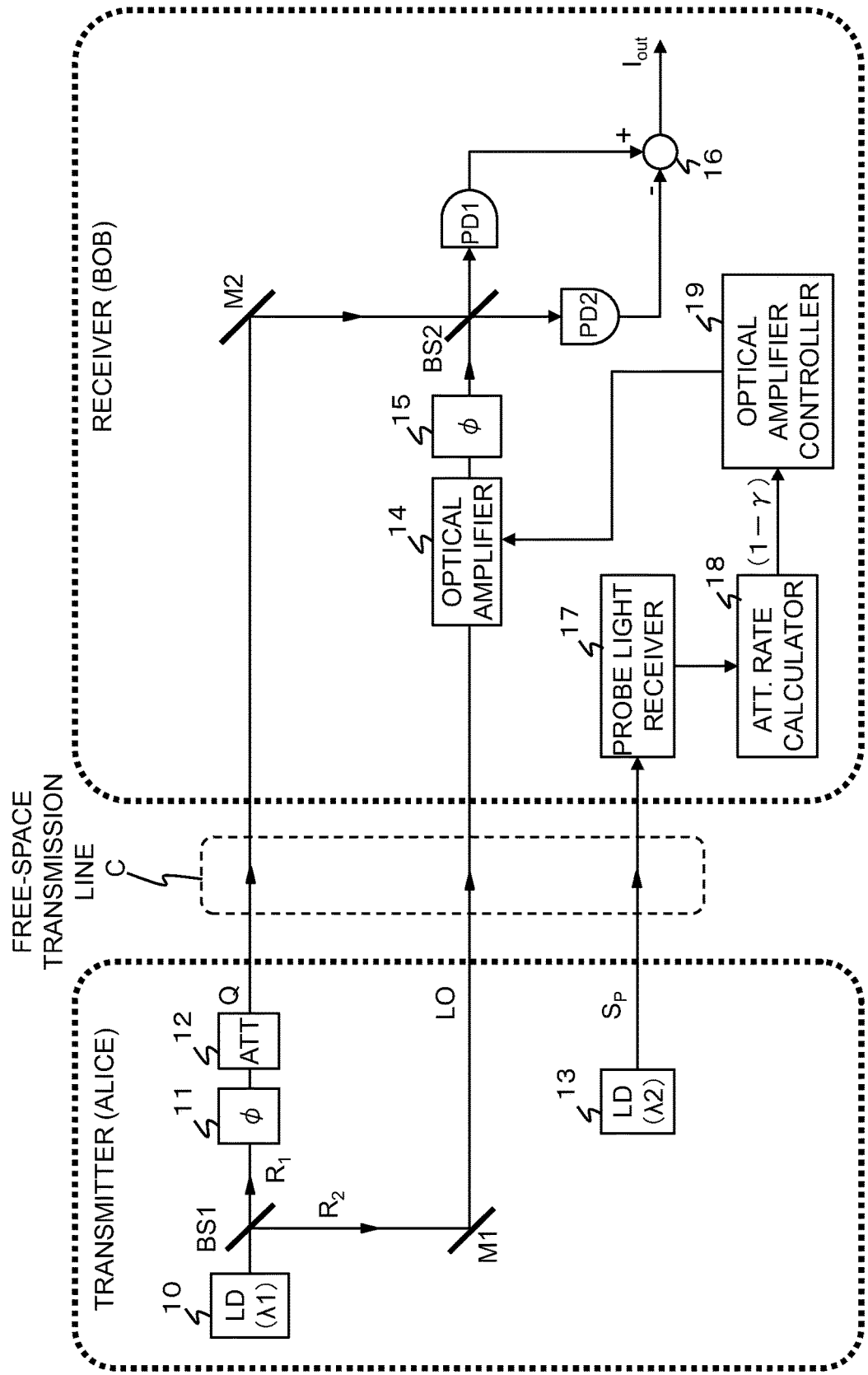

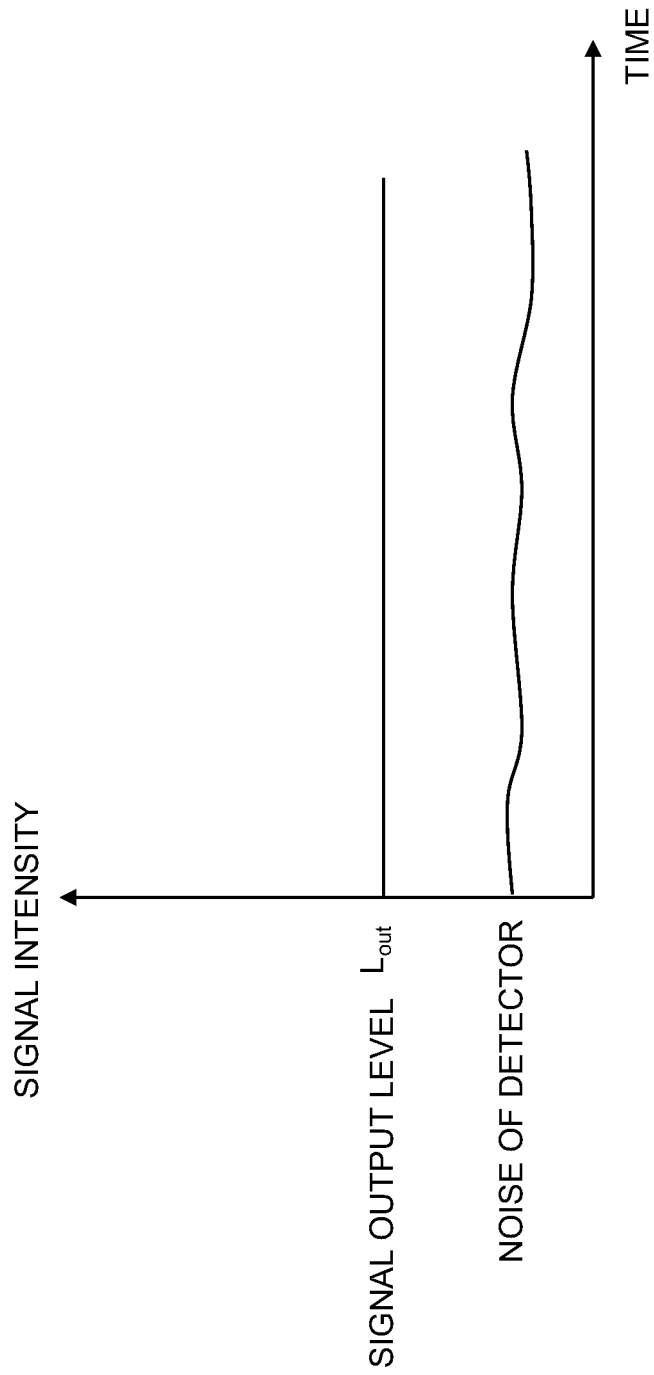

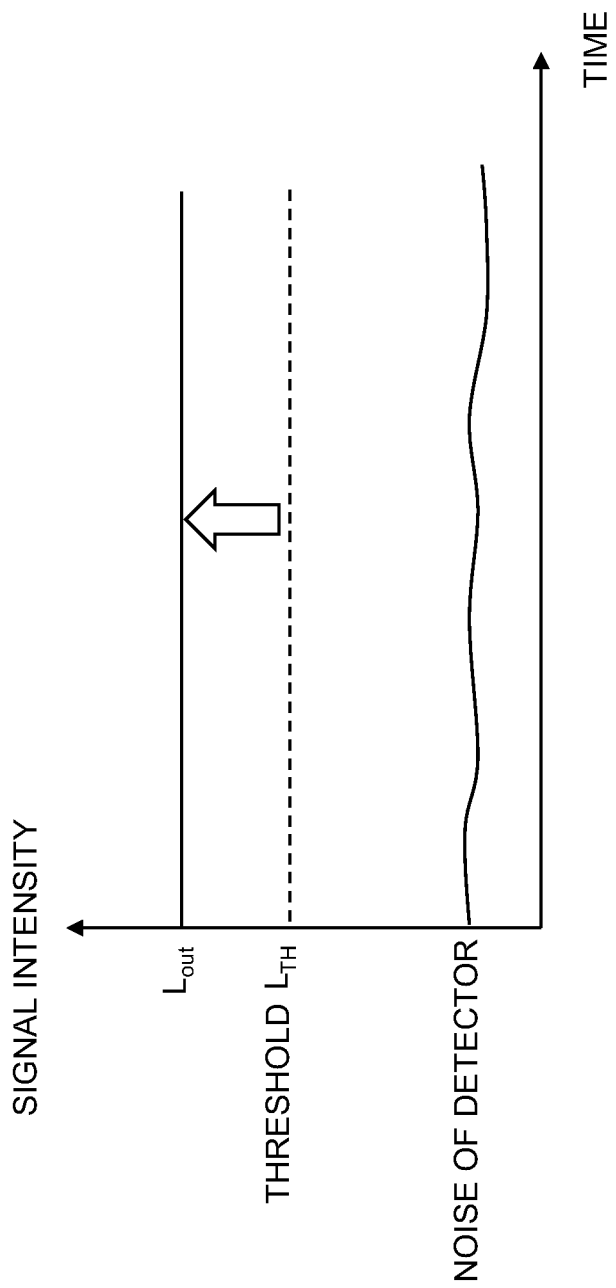

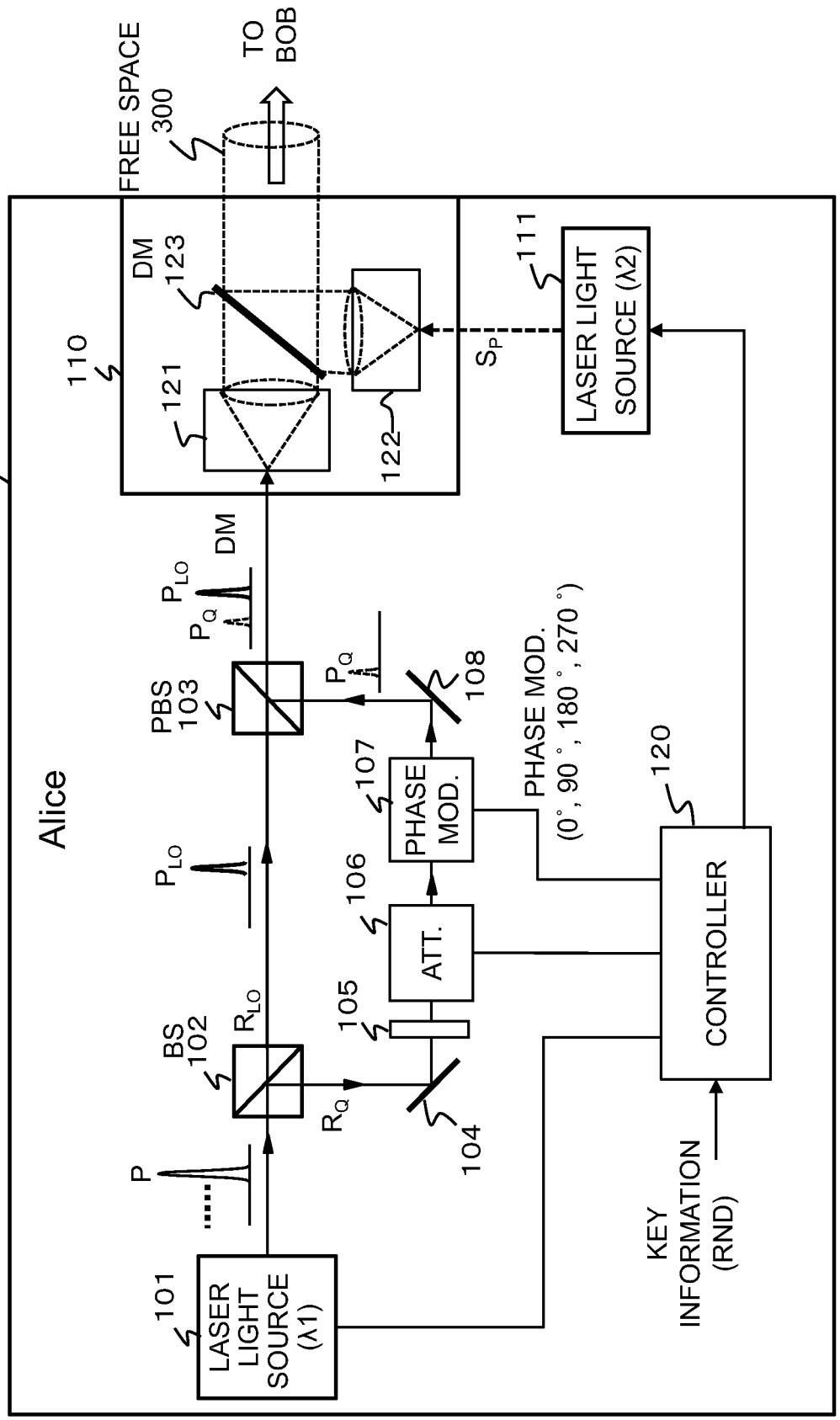

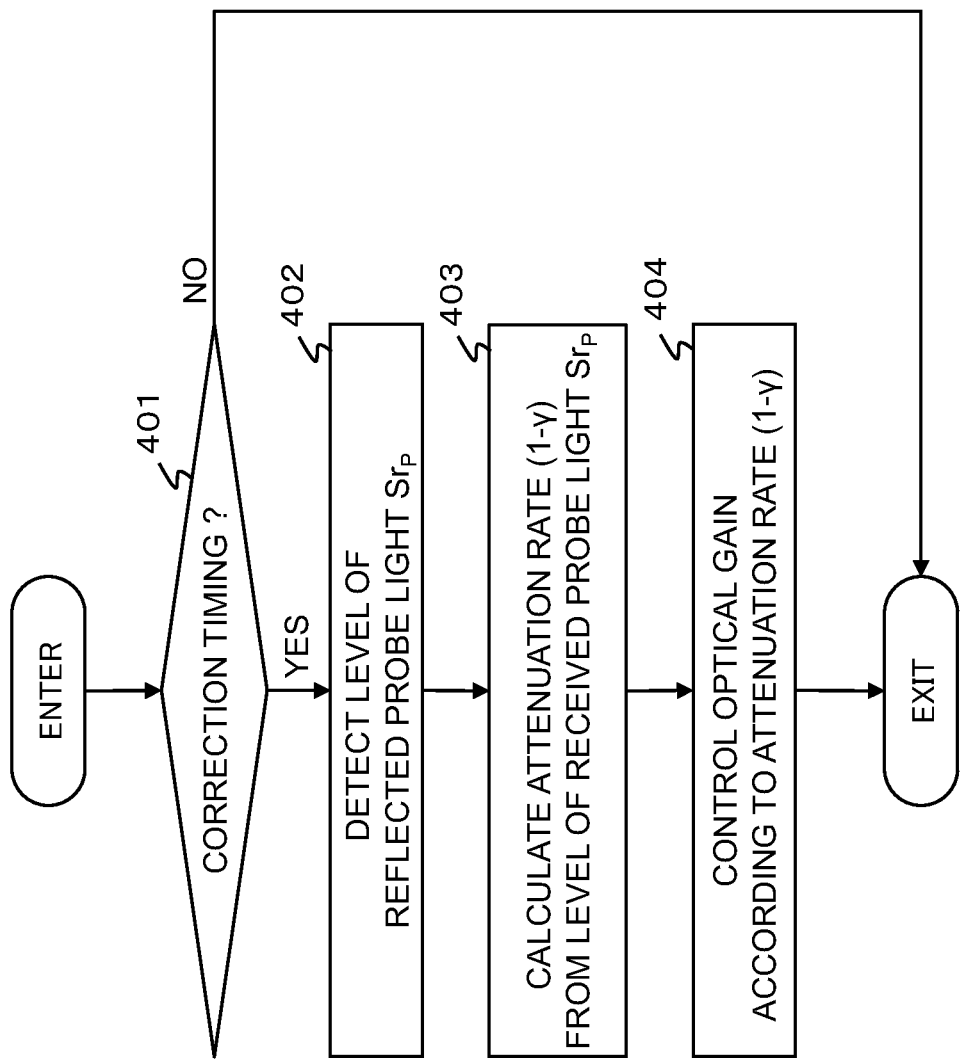

SECOND EXAMPLE EMBODIMENT

THIRD EXAMPLE EMBODIMENT

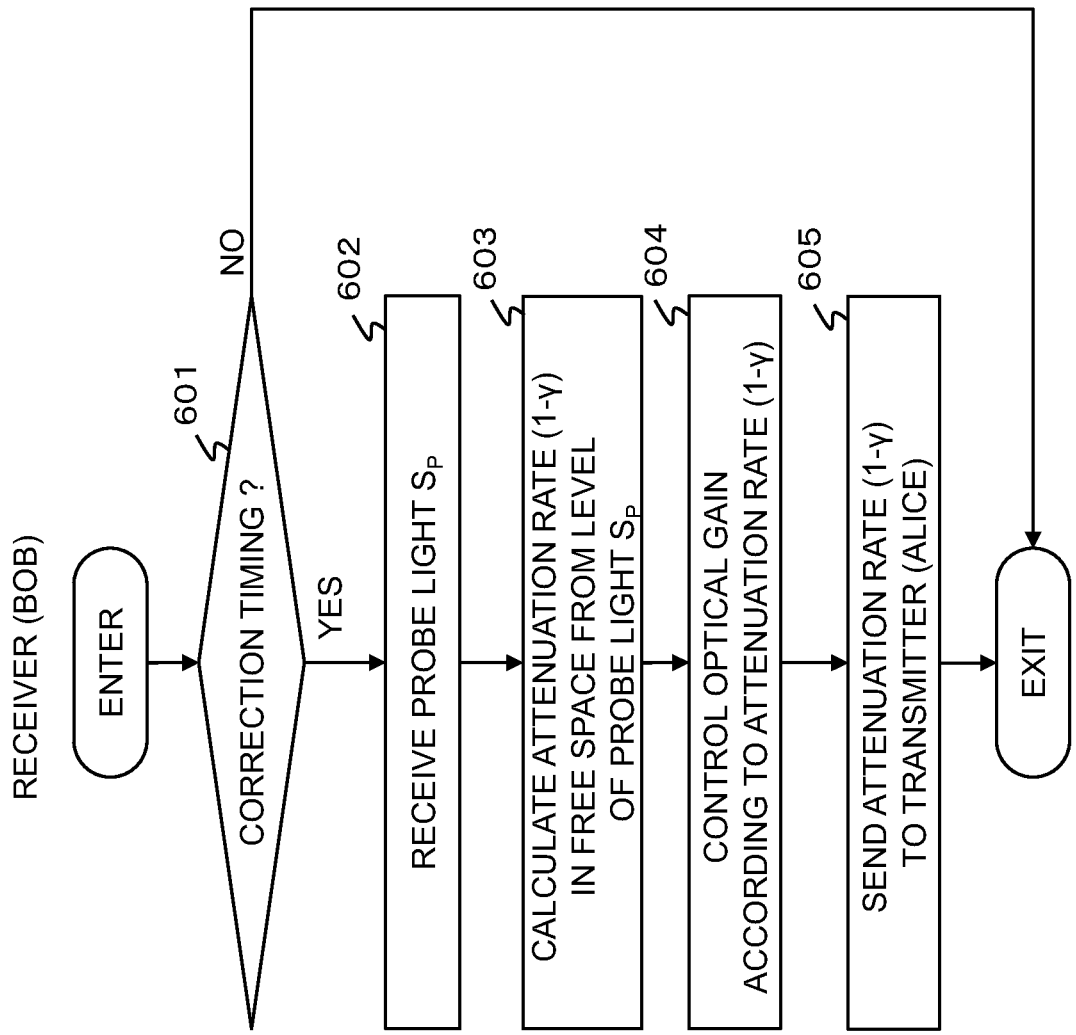

COMMUNICATION CONTROL TECHNIQUES IN QUANTUM CRYPTOGRAPHIC COMMUNICATION SYSTEM

INCORPORATION BY REFERENCE

This application is based upon and claims the benefit of priority from Japanese Patent Application No. 2022-155038, filed on Sep. 28, 2022, the disclosure of which is incorporated herein in its entirety by reference.

BACKGROUND

The present application relates to quantum cryptographic communication system, and in particular to a communication device and communication control method for communication devices that share cryptographic keys through quantum cryptographic communication.

In the field of optical communications, quantum key distribution (QKD) systems have been studied actively and put into practical use as a means of achieving high confidentiality in transmission channels. Recently, continuous-variable QKD has been proposed, which uses continuous variables such as the quadrature-phase amplitude of light instead of discrete variables in photon units. In particular, homodyne detection has attracted attention. The reason is that the homodyne detection measures the quadrature-phase amplitude at the receiver side, allowing measurement near the quantum noise limit to achieve high quantum efficiency even in the case of ordinary photodiodes used at room temperature (Japanese Patent Application Publication No. JP2000-101570: Patent document 1).

According to Patent document 1, in continuous-variable QKD, the laser light is split into a reference light (hereinafter referred to as LO (Local Oscillation) light) and a signal light by a beam splitter at a transmitter (Alice) terminal. The LO light and the randomly phase-modulated weak signal light are transmitted to the receiver (Bob) terminal. At the receiver terminal, the arriving LO light is randomly phase-modulated. The LO light thus obtained and the arriving weak signal light are detected by two photodetectors through a beam splitter. The homodyne detection enables the extraction of the phase information of the signal light that has been phase-modulated at the transmitter.

As described in Patent document 1, the level average of the signal light obtained by homodyne detection is represented by $2\sqrt{(n1)}\sqrt{(n0)}$, wherein n1 is the number of photons of the signal light and n0 is the number of photons of the LO light. It is known that the transmission loss of an optical fiber is more than 0.2 dB/km. The optical power is attenuated by 10 dB, or 1/10, at a transmission distance of 50 km, and by 1/100 at a transmission distance of 100 km. Accordingly, the signal level obtained by homodyne detection is similarly reduced to 1/10 and 1/100 or less at transmission distances of 50 km and 100 km, respectively.

Such signal level attenuation degrades the signal-to-noise (SN) ratio in homodyne detection. It is necessary to increase the signal level to prevent SN ratio degradation. However, the installation of an optical amplifier on the transmission line cannot be adopted because the signal light is also amplified in the transmission line, which may affect the cryptographic key information. As an alternative, the laser output power of the transmitter terminal may also be increased. However, to compensate for the above signal level attenuation, the output power of the laser light source must be significantly increased, for example, from 10 mW (Class 1) to 1 W (Class 4) at a wavelength band of 1.5 μm. Such a power-increase measure may be impractical due to upsizing of equipment, durability problems with optical components, and reduced security during transmission.

To improve the SN ratio in homodyne detection, a measure of amplifying only LO light at the receiver terminal has been proposed in Japanese Patent Application Publication No. JP2007-266738 (Patent document 2).

SUMMARY

However, Patent document 2 describes merely amplification of the LO light for improvement of SN ratio in homodyne detection, not describing how the amplification is controlled to achieve the improvement of the SN ratio.

In addition to improving the SN ratio in homodyne detection, it is also important to stabilize the signal output level obtained based on the LO light and signal light. In the Patent document 2, the amplified LO light is used to control the timing of the phase modulation process. Accordingly, although high precision in timing control may be achieved, it is not possible to obtain the stability of the signal output level.

Furthermore, the above-mentioned Patent documents 1 and 2 assume a system using the optical fiber as an optical transmission line. Accordingly, sufficient SN ratio and output stability cannot be expected in the case of using an optical transmission line which has a larger attenuation rate than optical fibers and propagation characteristics susceptible to environment. For example, assuming free space as an optical transmission line, it is necessary to take into account the amount of water vapor in the air, local variations in air density due to temperature changes, etc. In the present disclosure, free space is assumed to be optical transmission space having intensity reduction factors such as scattering and absorbing.

Therefore, an object of the present invention is to provide a quantum cryptographic communication system, a communication device, and a communication control method that can achieve improvement in SN ratio and stability of the signal output in homodyne detection even in the case of an optical transmission line having the propagation characteristics susceptible to environmental changes.

According to an illustrative embodiment of the disclosure, a communication device that detects a signal output by homodyne detection in a quantum cryptographic communication system, includes: an optical reception section configured to receive signal light and reference light arriving from a transmitting-side communication device through an optical transmission line, wherein the optical transmission line has propagation characteristics of light varying due to changes of environment, wherein the signal light is weak light having quantum states and the reference light is light having no quantum states; an optical amplifier that amplifies received reference light; a homodyne detector configured to generate the signal output based on received signal light and the received reference light amplified by the optical amplifier; a probe light receiver that receives probe light arriving from the transmitting-side communication device through the optical transmission line; and a controller configured to calculate a transmission line state detected based on received probe light and control a gain of the optical amplifier according to the transmission line state.

According to an illustrative embodiment of the disclosure, a communication control method of a receiver in a quantum cryptographic communication system including a transmitter and the receiver which are optically connected to the transmitter through an optical transmission line having propagation characteristics of light varying due to changes of environment, the method includes: by an optical reception section, receiving signal light, reference light and probe light arriving from the transmitter through the optical transmission line, wherein the signal light is weak light having quantum states and the reference light is light having no quantum states; by a controller, calculating a transmission line state detected based on received probe light and controlling an amplification factor of received reference light according to the transmission line state; and by a detector, detecting a signal output by homodyne detection based on the received signal light and the received reference light amplified at the amplification factor.

According to an illustrative embodiment of the disclosure, a quantum cryptographic communication system comprising a transmitter and a receiver, wherein the transmitter and the receiver are optically connected to each other through an optical transmission line having propagation characteristics of light varying due to changes of environment, the transmitter includes: an optical transmission section configured to generate signal light and reference light from coherent light, and transmit the signal light and the reference light to the optical transmission line, wherein the signal light is weak light having quantum states and the reference light is light having no quantum states; and a probe light transmitter configured to transmit probe light of a predetermined intensity to the optical transmission line, the receiver includes: an optical reception section configured to receive received signal light and received reference light arriving from the transmitter through the optical transmission line; an optical amplifier that amplifies the received reference light; a homodyne detector configured to generate a signal output based on the received signal light and the received reference light amplified by the optical amplifier; a probe light receiver that receives probe light arriving through the optical transmission line; and a controller configured to calculate an attenuation rate of received probe light to the probe light on transmitter side and control a gain of the optical amplifier according to the attenuation rate.

As described above, improvement in SN ratio and stability of the signal output in homodyne detection can be achieved even in the case of an optical transmission line having the propagation characteristics susceptible to environmental changes.

BRIEF DESCRIPTION OF THE DRAWINGS

FIG. 1 is a block diagram illustrating the schematic structure of a quantum cryptographic communication system according to a first example embodiment of the present disclosure.

FIG. 2A is a graph for explaining SN ratio in the case of received signal being at lower levels.

FIG. 2B is a graph for explaining SN ratio in an application of the present example embodiment.

FIG. 3A is a block diagram illustrating the configuration of a transmitter (Alice) in a quantum cryptographic communication system according to a first example of the present disclosure.

FIG. 4 is a flowchart illustrating a control method of the receiver (Bob) in the first example of the present disclosure.

FIG. 10 is a flowchart illustrating the operation of the receiver (Bob) in the quantum cryptographic communication system according to the second example.

DETAILED DESCRIPTION

Figure 3B:
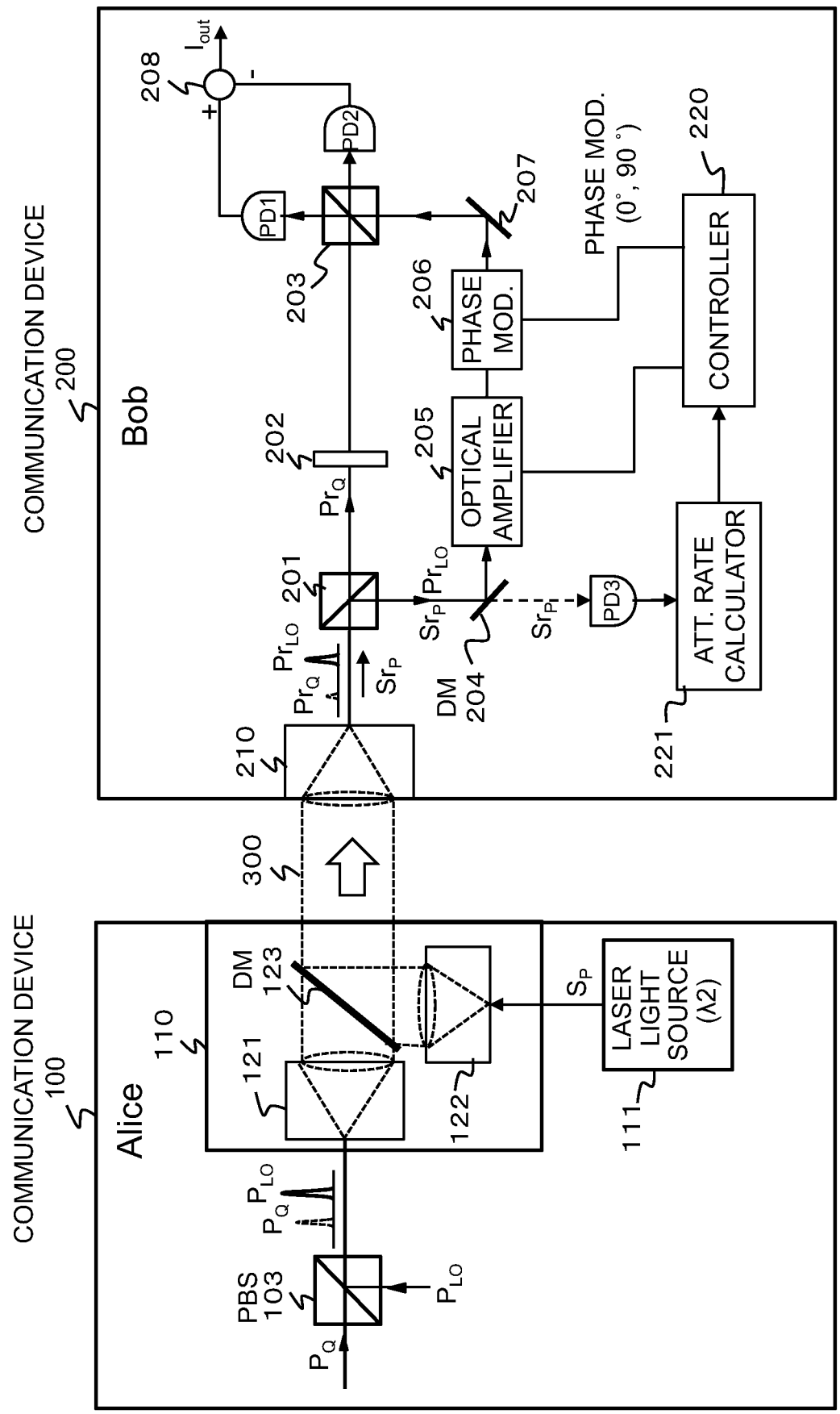
FIG. 3B is a block diagram illustrating the configuration of a receiver (Bob) and part of the transmitter (Alice) in FIG. 3A.

While the present disclosure has been particularly shown and described with reference to example embodiments thereof, the present disclosure is not limited to these example embodiments. It will be understood by those of ordinary skill in the art that various changes in form and details may be made therein without departing from the spirit and scope of the present disclosure as defined by the claims. And each embodiment can be appropriately combined with other embodiments.

OVERVIEW OF EXAMPLE EMBODIMENTS

Hereinafter, free space is exemplified as an optical transmission line susceptible to the environment. In a quantum cryptographic communication system according to illustrative embodiments of the present disclosure, a transmitter transmits signal light of weak intensity and reference light of normal intensity through free space to a receiver. The weak signal light has quantum states and the reference light has no quantum states. The receiver includes an optical amplifier that amplifies only the received reference light and detects signal information by homodyne detection from the received signal light and the amplified reference light.

Further, the transmitter transmits probe light to the receiver through the same free space. The receiver receives the probe light to measure the propagation characteristics of the laser light in the free space. In an optical transmission line such as the free space easily affected by environment, it is important to measure the propagation characteristic which shows how the light intensity changes with distance. In the present disclosure, a transmission line state (attenuation rate or transmission rate) indicating the degree of attenuation or transmission is measured as a propagation characteristic. The transmission line state can be calculated from the intensity of the probe light at transmission and the intensity of the received probe light.

According to the disclosure, the gain of the reference light is controlled according to the transmission line state (attenuation rate or transmission rate), allowing the signal level obtained by homodyne detection to be maintained at a predetermined range. Accordingly, even in the case of an optical transmission line which has a large attenuation rate and is easily affected by the environment, an improvement in SN ratio in homodyne detection and the stabilization of signal outputs can be achieved. Hereinafter, a transmission line state is assumed to be an attenuation rate.

Example embodiments and examples of the present invention will be described in detail below with reference to the drawings. However, the components described in the following example embodiments and examples are merely examples, and are not intended to limit the technical scope of the invention to them alone.

1. First Example Embodiment

As illustrated in FIG. 1, a transmitter (Alice) and a receiver (Bob) can perform cryptographic communication using a quantum cryptographic key generated between them. Here, it is assumed that the transmitter (Alice) and receiver (Bob) are optically connected by a free-space transmission line C. The free-space transmission line C uses free space for optical transmission channels. The free-space transmission line C enables optical communications between the transmitter and the receiver simply by installing a transmitter-side optical system on the transmitter and a receiver-side optical system on the receiver, thus reducing costs of equipment because of eliminating the need for optical cables and the likes. On the other hand, the free-space transmission line C is prone to transmission losses and fluctuations in loss due to environmental conditions such as temperature and humidity. In the present disclosure as described in detail below, an adjustment means is provided to cancel out the losses caused by such environmental conditions.

The transmitter (Alice) has a laser light source 10, a beam splitter BS1, a phase modulator 11, an attenuator 12, a mirror M1, and a laser light source 13. The laser light sources 10 and 13 that emits a beam of probe light. The laser light sources 10 and 13 emit laser beams of different wavelengths, respectively. Here, it is assumed that the oscillation wavelength of the laser light source 10 is $\lambda 1$ and that of the laser light source 13 is $\lambda 2$.

The laser light source 10 generates coherent light, and the beam splitter BS1 splits the coherent light into two beams of light respectively on routes $R_1$ and $R_2$. The light on one route $R_1$ is phase-modulated by the phase modulator 11 and further attenuated by the attenuator 12 to become weak signal light Q having quantum states and is sent to the free-space transmission line C. The light on the other route $R_2$ is reflected by the mirror M1 and is sent as reference light LO having normal intensity without quantum states to the free-space transmission line C. As described in the above-mentioned Patent document 1, the intensity of the reference light LO is significantly greater than that of the signal light Q. For example, the signal light Q has an intensity of about one photon, while the reference light LO has an intensity of about 10 million photons.

The laser light source 13 generates coherent light and sends it as probe light $S_P$ to the free-space transmission line C. The probe light $S_P$ is laser light of a predetermined intensity which is sufficiently strong enough to measure the optical attenuation in the free-space transmission line C, which will be described below. The probe light $S_P$ sent by the transmitter (Alice) is preset to an intensity that can be reliably detected by the receiver (Bob), and in this example embodiment, the intensity is equal to or higher than the reference light LO transmitted by the transmitter (Alice).

The receiver (Bob) has an optical amplifier 14, a phase modulator 15, a mirror M2, a beam splitter BS2, two photodetectors PD1 and PD2, and a subtractor 16, and further has a probe light receiver 17, an attenuation rate calculator 18 and an optical amplifier controller 19.

The optical amplifier 14 amplifies the received reference light LO arriving from the transmitter (Alice) directly while maintaining the wavelength and phase. The phase modulator 15 phase-modulates the amplified, received reference light LO. The phase-modulated, received reference light LO enters the beam splitter BS2. The received signal light Q arriving from the transmitter (Alice) is reflected by the mirror M2 to the beam splitter BS2. The beam splitter BS2 has equal light transmittance and reflectance, which superimposes as inputs the phase-modulated, received reference light LO and the received signal light Q reflected by the mirror M2. In other words, the beam splitter BS1 of the transmitter (Alice) and the beam splitter BS2 of the receiver (Bob) constitute one interferometer composed of two equal-length routes $R_1$ and $R_2$.

Two light beams output from the beam splitter BS2 are incident on the photodetectors PD1 and PD2, respectively. The photodetectors PD1 and PD2 convert the two light beams to electrical signals, respectively, which are output as detection signals to the subtractor 16. The subtractor 16 calculates a difference between the detection signals to output a difference signal. The difference signal is a signal output $I_{out}$ obtained by homodyne detection. The photodetectors PD1 and PD2 may employ normal photodiodes operable at room temperature.

The probe light receiver 17 receives probe light $S_p$ arriving from the transmitter (Alice) through the free-space transmission line C to convert the received intensity of the probe light $S_p$ to an electrical signal. The electrical signal is output to the attenuation rate calculator 18. The probe light receiver 17 may use a normal photodiode at room temperature. The attenuation rate calculator 18 calculates the attenuation rate (1−γ) of the probe light propagating through the free-space transmission line C from the predetermined intensity of the probe light $S_p$ transmitted from the laser light source 13 of the transmitter (Alice) and the received intensity of the probe light $S_p$ received by the probe light receiver 17. The attenuation rate (1−γ) is output to the optical amplifier controller 19, wherein γ is transmission rate which is a ratio of the received intensity of the probe light $S_p$ received by the probe light receiver 17 to the predetermined intensity of the probe light $S_p$.

The optical amplifier controller 19 controls the optical gain of the optical amplifier 14 to amplify the received reference light LO according to the attenuation ratio (1−γ) so that the signal level of the signal output $I_{out}$ is maintained within a predetermined range. The optical amplifier controller 19 controls such that the gain of the optical amplifier 14 is increased relative to a predetermined value as the attenuation rate (1−γ) becomes larger and is decreased relative to the predetermined value as the attenuation rate (1−γ) becomes smaller. Accordingly, a change in attenuation caused by environment can be canceled out to maintain the signal level of the signal output $I_{out}$. The received reference light LO is amplified by the optical amplifier 14 according to the attenuation rate (1−γ), resulting in the increased signal level of the signal output $I_{out}$ and the improved SN ratio of the signal output $I_{out}$. Furthermore, the gain of the optical amplifier 14 is controlled according to the attenuation ratio (1−γ), resulting in the improved stability of the signal output $I_{out}$.

The gain of the optical amplifier 14 may be determined for the attenuation rate (1−γ) using a function or table prepared in advance. In other words, an experimentally obtained function is prepared in advance and the gain may be calculated as a function of the attenuation rate (1−γ). Alternatively, a correspondence table between the attenuation rate (1−γ) and the gain has been experimentally obtained. The gain of the optical amplifier 14 may be calculated for the attenuation rate (1−γ) by searching the correspondence table.

The optical amplifier 14 may employ a controllable-gain optical amplifier that amplifies the received reference light LO received from the transmitter (Alice) while maintaining its wavelength and phase. For example, an EDFA (Erbium-Doped Fiber Amplifier) or a SOA (Semiconductor Optical Amplifier) can be used as such an optical amplifier 14. In the case where the EDFA is used for the optical amplifier 14, the received reference light LO can be amplified with a high efficiency such as more than 80% amplification efficiency for pumping light. The optical gain of the EDFA can be controlled by controlling the current supplied to the laser that is the source of the pumping light. In the case where the optical amplifier 14 is the SOA, the gain can be controlled by the current supplied to the SOA.

As described above, the system according to the first example embodiment calculates the attenuation rate (1−γ) using the probe light $S_p$, allowing detection of changes in loss due to transmission loss and environmental variability from the transmitter (Alice) to the receiver (Bob). In this manner, the optical gain of the optical amplifier 14 is controlled according to the attenuation ratio (1−γ), thereby becoming possible to improve the SN ratio and stabilization of the signal output $I_{out}$ obtained by homodyne detection.

For example, as illustrated in FIG. 2A, as the signal output level $L_{out}$ is lower due to a large transmission loss of the free-space transmission line C, the ratio of the signal output level $L_{out}$ to the noise level of photodetectors PD1 and PD2 (signal-to-noise ratio) becomes lower. In contrast, according to the present example embodiment, the gain of the optical amplifier 14 is controlled according to the attenuation ratio (1−γ) calculated using the probe light $S_p$. This allows the signal output level $L_{out}$ to be maintained at the threshold value $L_{TH}$ or more corresponding to a predetermined SN ratio, as illustrated in FIG. 2B. Therefore, even in the case where the transmission loss of the free-space transmission line C is large, the SN ratio in homodyne detection at the receiving side can be improved without increasing the power of the laser light source 10 nor interposing an optical amplifier in the free-space transmission line C.

Furthermore, the attenuation rate (1−γ) calculated from the received intensity of the probe light $S_p$ can be used to maintain the optical signal output level $L_{out}$ within a predetermined range, thereby achieving stabilization of the signal output $I_{out}$. In addition, switching the free-space transmission line C (such as route switching) can be performed by an optical switch or the like in response to detection of an unauthorized interception of a quantum cryptographic communication. In this case, it is possible to deal with differences in transmission loss before and after the route switch.

2. First Example

As a first example of the present disclosure, a system will be described, in which signal light Q, reference light LO and probe light $S_p$ are transmitted through a free-space transmission line. The communication system shown in FIGS. 3A and 3B is an example according to the above-described first example embodiment.

As illustrated in FIGS. 3A and 3B, the quantum cryptographic communication system according to the first example includes a communication device 100 including a transmitter (Alice) and a communication device 200 including a receiver (Bob). The transmitter (Alice) and the receiver (Bob) are optically connected by free space 300 as an optical transmission line.

2.1) Transmitter

As illustrated in FIG. 3A, the transmitter (Alice) 100 includes an optical signal system, optical probe system, transmitter-side optical system 110, and a controller 120. The optical signal system includes a laser light source 101, an unpolarizing light beam splitter (BS) 102, a polarizing light beam splitter (PBS) 103, a mirror 104, a half-wave plate 105, an attenuator 106, a phase modulator 107, and a mirror 108. As described below, the optical signal system generates a reference light pulse $P_{LO}$ and a signal light pulse $P_Q$ from the transmission light pulse of the laser light source 101. The reference light pulse $P_{LO}$ and the signal light pulse $P_Q$ have polarization planes orthogonal to each other and are separated in time. The reference light pulse $P_{LO}$ and the signal light pulse $P_Q$ are output to the free space 300 from the transmitter-side optical system 110.

The optical probe system includes a laser light source 111, which emits linearly polarized probe light $S_p$ as with the laser light source 101. The probe light $S_p$ is output to the free space 300 from the transmitter-side optical system 110. The probe light $S_p$ may be a light pulse of predetermined pulse width or a laser light beam that lasts for a certain length of time. The laser light source 101 emits laser light of wavelength λ1 and the laser light source 111 emits laser light of wavelength λ2 different from the wavelength λ1.

The transmitter-side optical system 110 includes beam expanders 121 and 122 and a dichroic mirror (DM) 123. A beam expander is an optical element that convert a light beam input from an optical fiber on input port to a collimated light beam of a larger diameter. A DM is an optical element configured to transmit light of predetermined wavelength band and reflect light of other wavelengths. Accordingly, the DM 123 is configured to transmit a light beam of wavelength λ1 and reflects a light beam of other wavelengths (including wavelength λ2).

The beam expanders 121 and 122 are positioned on the plane defined by their optical axes so that their optical axes are orthogonal. The DM 123 is positioned in an inclined posture such that it is inclined 45° counterclockwise to the traveling direction of the outgoing light from the beam expander 121 and clockwise to the traveling direction of the outgoing light from the beam expander 122. Accordingly, the light of wavelength λ1 input from beam expander 121 is transmitted through the DM 123 to the free space 300, while the light of wavelength λ2 input from the beam expander 122 is reflected by the DM 123 to the free space 300.

The controller 120 controls the laser light source 101, the attenuator 106, and the phase modulator 107 to generate two successive pulses of a reference light pulse $P_{LO}$ and a signal light pulse $P_Q$ as described above. The controller 120 also controls the laser light source 111 to output the probe light $S_p$ at predetermined periods or at a desired timing.

The laser light source 101 outputs a linearly polarized light pulse P of wavelength μ1 to the input port of the unpolarizing light beam splitter 102. Each light pulse P is split into two light pulses by the unpolarizing beam splitter 102. One light pulse is sent to a reference-side route $R_{LO}$ and the other light pulse is sent to the signal-side route $R_Q$. The light pulse on the reference-side route $R_{LO}$ is a normal-intensity reference light pulse $P_{LO}$ having no quantum states. The reference light pulse $P_{LO}$ passes through the polarizing beam splitter 103 as it is, and enters the beam expander 121 of the transmitter-side optical system 110.

The signal-side route $R_Q$ includes the mirror 104, the half-wave plate 105, the attenuator 106, the phase modulator 107, and the mirror 108. The signal-side route $R_Q$ has a longer optical route than the reference-side route $R_{LO}$. The half-wave plate 105 rotates the plane of polarization of the light pulse on the route $R_Q$ by 90 degrees. The attenuator 106 attenuates the light pulse to output a weak light pulse having quantum states. The phase modulator 107 performs phase modulation on the weak light pulse to generate the signal light pulse $P_Q$. The signal light pulse $P_Q$ is reflected by the mirror 108 to the polarizing beam splitter 103. The attenuator 106 and phase modulator 107 may be arranged in reverse order with respect to the traveling direction of the light pulse.

The polarization plane of the signal light pulse $P_Q$ is rotated by 90 degrees by the half-wave plate 105. Accordingly, the signal light pulse $P_Q$ is reflected by the polarizing beam splitter 103 to the beam expander 121 of the transmitter-side optical system 110. However, the signal light pulse $P_Q$ enters the beam expander 121 behind the reference light pulse $P_{LO}$ by a time delay caused by the difference in optical length between the routes $R_Q$ and $R_{LO}$. Thus, from a single light pulse P, a reference light pulse $P_{LO}$ and a signal light pulse $P_Q$ are generated, which are orthogonal in polarization plane to each other and separated in time. In the case where the unpolarizing beam splitter 102 is replaced with a polarizing beam splitter, the half-wave plate 105 can be eliminated.

The controller 120 controls the overall operation of the communication device 100 and, in this example, controls the laser light source 101, the attenuator 106, the phase modulator 107, and the laser light source 111 in the transmitter (Alice). The phase modulator 107, under the control of the controller 109, performs four different phase modulations (0°, 90°, 180°, 270°) on each weak light pulse output from the attenuator 106 according to the original random numbers of a cryptographic key to generate the signal light pulse $P_Q$. Thus, two successive pulses are generated as a double pulse, which includes a normal-intensity reference light pulse $P_{LO}$ and a phase-modulated signal light pulse $P_Q$. A train of double pulses enters the beam expander 121 of the transmitter-side optical system 110.

The beam expander 121 converts the reference light pulse $P_{LO}$ and signal light pulse $P_Q$ respectively to collimated reference light pulse and collimated signal light pulse having larger diameters, and transmits them through the DM 123 into the free space 300.

On the other hand, the laser light source 111 outputs probe light $S_p$ of a predetermined duration of time to the beam expander 122 at predetermined intervals or at desired timing according to the control of the controller 109. The collimated probe light of wavelength λ2, whose diameter is expanded by the beam expander 122, is reflected by the DM 123 to the free space 300. Hereafter, the laser light source 111 is assumed to output the probe light $S_p$ at a timing for each predetermined time slot.

In this way, through the free space 300, the double pulse of wavelength λ1 including reference light pulse $P_{LO}$ and signal light pulse $P_Q$ and the probe light $S_p$ of wavelength λ2 lasting for a given time at a given timing are transmitted.

2.2) Receiver

As illustrated in FIG. 3B, a beam expander 210 of the receiver (Bob) is a receiver-side optical system which is installed so that its optical axis is aligned with the transmitter-side optical system 110 of the transmitter (Alice). This allows the beam expander 210 of the receiver (Bob) to receive the reference light pulse $P_{LO}$, the signal light pulse $P_Q$ and the probe light $S_p$ through the free space 300.

The output port of the beam expander 210 is optically connected to the input port of a polarizing beam splitter 201 through an optical fiber. Accordingly, if disturbances such as air fluctuations in the free space 300 occur, the output light of the beam expander 121 may not be focused correctly on the core of the optical fiber. Also, the intensity of the output light of the beam expander 121 may be greatly reduced due to disturbances such as water vapor and particulates in the free space 300. According to the present example, the receiver (B0b) measures the attenuation rate of the probe light and amplifies the received reference light according to the attenuation rate, allowing the received intensity reduction and fluctuations cause by disturbances to be cancelled out. Hereinafter, details will be described.

In addition to the beam expander 210, the receiver (Bob) includes a signal receiving section and a probe detection section. A controller 220 controls the overall operation of the communication device 200. The signal receiving section includes an optical signal system, an optical reference system and a signal detection section. The optical signal system includes a polarizing beam splitter 201, a half-wave plate 202, and an unpolarizing beam splitter 203. The optical reference system includes the polarizing beam splitter 201, a dichroic mirror (DM) 204, an optical amplifier 205, a phase modulator 206, a mirror 207 and the unpolarizing beam splitter 203. The signal detection section includes photodetectors PD1 and PD2 and a subtractor 208. The probe detection section includes the photodetector PD3 and the attenuation rate calculator 221.

The polarizing beam splitter 201 inputs a received reference light pulse $Pr_{LO}$, a received signal light pulse $Pr_Q$ and a received probe light $Sr_p$ from the beam expander 210. As mentioned above, the polarization plane of the received reference light pulse $Pr_{LO}$ is orthogonal to that of the signal light pulse $Pr_Q$.

The received signal light pulse $Pr_Q$ passes through the polarizing beam splitter 201 as it is and enters the half-wave plate 202. Since the half-wave plate 202 rotates the polarization plane by 90 degrees, the received signal light pulse $Pr_Q$ transmitted through the half-wave plate 202 has the same polarization plane as the received reference light pulse $Pr_{LO}$. The received signal light pulse $Pr_Q$ transmitted through the half-wave plate 202 enters the first input port of the unpolarizing light beam splitter 203.

On the other hand, the received reference light pulse $Pr_{LO}$ is reflected by the polarizing beam splitter 201 to exit the second output port of the polarizing beam splitter 201. The received reference light pulse $Pr_{LO}$ reflected from the polarizing beam splitter 201 is reflected by the mirror 204 to the second input port of the unpolarizing beam splitter 203 through the optical amplifier 205, the phase modulator 206 and the mirror 207. The received probe light $Sr_p$ is the probe light $S_p$ arriving from the laser light source 111 of the transmitter (Alice). Accordingly, the received probe light $Sr_p$ is reflected by the polarizing beam splitter 201 as with the received reference light pulse $Pr_{LO}$.

The DM 204, contrary to the DM 123 at the transmitting side, is configured to transmit light of wavelength λ2 and reflect light of other wavelengths (including λ1). Accordingly, the DM 204 reflects the reference light pulse $Pr_{LO}$ of wavelength λ1 and transmits the received probe light $Sr_p$ of wavelength λ2.

It should be noted that the route of the received signal light pulse $Pr_Q$ is the same length as the route $R_{LO}$ of the transmitter (Alice), and the route of the received reference light pulse $Pr_{LO}$ is the same length as the route $R_Q$ of the transmitter (Alice). Accordingly, the received signal light pulse $Pr_Q$ and the received reference light pulse $Pr_{LO}$, which enter the first and second input ports of the unpolarizing beam splitter 203, respectively, reach the unpolarizing beam splitter 203 through different optical paths of the same length from the unpolarizing beam splitter 102 of the transmitter (Alice). The optical configuration of the transmitter (Alice) and receiver (Bob) thus constitutes an interferometer described in FIG. 1.

The optical amplifier 205 may employ, for example, an EDFA or SOA. The optical amplifier 205 amplifies the received reference light pulse $Pr_{LO}$ while maintaining its wavelength and phase. The gain of the optical amplifier 205 is controlled by the controller 220 as described later. The phase modulator 206 phase-modulates the optically amplified, received reference light pulse $Pr_{LO}$. The phase modulation of the phase modulator 206 is controlled by the controller 220. As described above, the phase modulator 107 of the transmitter (Alice) performs four different phase modulations (0°, 90°, 180°, 270°) on the signal light pulse $P_Q$ to be transmitted, while the phase modulator 206 of the receiver (Bob) performs two different phase modulations (0°, 90°) on the received reference light pulse $Pr_{LO}$. The received reference light pulse $Pr_{LO}$ thus phase-modulated is reflected by the mirror 207 to the unpolarizing beam splitter 203.

The unpolarizing beam splitter 203 inputs the received signal light pulse $Pr_Q$, whose polarization plane has been rotated by 90 degrees by the half-wave plate 202, and the received reference light pulse $Pr_{LO}$ that has been phase-modulated by the phase modulator 206. The unpolarizing beam splitter 203 has equal light transmittance and reflectance. Accordingly, the unpolarizing beam splitter 203 superimposes the received signal light pulse $Pr_Q$ and the received reference light pulse $Pr_{LO}$ to emit the resultant from the two output ports. The two output ports of the unpolarizing beam splitter 203 are optically connected to the photodetectors PD1 and PD2 through optical transmission lines, respectively. The photodetectors PD1 and PD2 receive two outgoing beams of light from the two output ports of the unpolarizing beam splitter 203, respectively. As described before, normal photodiodes may be used as the photodetectors PD1 and PD2 at room temperature.

The subtractor 208 performs subtraction calculation of detection signals output from the photodetectors PD1 and PD2, respectively, and outputs the resulting difference signal as signal output $I_{out}$ obtained by homodyne detection.

On the other hand, the received probe light $Sr_p$ transmitted through the DM 204 is detected by the photodetector PD3, which outputs the detection signal to the attenuation rate calculator 221. The attenuation rate calculator 221 calculates the attenuation rate $(1-\gamma)$ from the received intensity of the received probe light $Sr_p$ obtained by the photodetector PD3 and the predetermined intensity of the probe light $S_p$ on the transmitting side.

The attenuation rate $(1-\gamma)$ reflects not only transmission losses in the free space 300, but also the intensity reduction of the received probe light $Sr_p$ at the beam expander 210. In other words, the attenuation of the received probe light $Sr_p$ may be caused by misalignment of the focusing position of the output light of the beam expander 210 due to disturbances in the free space 300 as described above.

The controller 220 controls the optical gain of the optical amplifier 205. The optical amplifier 205 amplifies the received reference light pulse $Pr_{LO}$ at an optical gain in response to the attenuation rate $(1-\gamma)$, thereby maintaining the signal level of the signal output $I_{out}$ within a predetermined range. The controller 220 may prepare a function previously determined by measurement and calculate the optical gain as a function of the attenuation rate $(1-\gamma)$. Alternatively, a correspondence table between the attenuation rate $(1-\gamma)$ and the gain may be experimentally prepared. The gain of the optical amplifier 14 for the attenuation rate $(1-\gamma)$ can be calculated by referring to the correspondence table. It should be noted that the control of the optical gain of the optical amplifier 205 may be performed when the attenuation rate $(1-\gamma)$ or its change exceeds a predetermined threshold value.

<Optical Gain Control>

It is assumed in the quantum cryptographic communication system according to the example that the cryptographic communication using quantum keys between the communication devices 100 and 200 is performed according to predetermined time slots. According to the present example, as illustrated in FIG. 4, the controller 220 inputs the attenuation rate $(1-\gamma)$ from the attenuation rate calculator 221 for each communication time slot to control the optical gain of the optical amplifier 205.

Referring to FIG. 4, the controller 220 determines whether or not it is correction timing for each predetermined time slot (operation 401). If it is the correction timing (YES in operation 401), the photodetector PD3 receives the received probe light $Sr_p$ to detect the level of the received probe light $Sr_p$ (operation 402). The attenuation rate calculator 221 inputs the detected level from the photodetector PD3 and calculates the ratio of the detected level to the predetermined transmission level at the time of transmission of the probe light $S_p$ as the attenuation rate $(1-\gamma)$ at the present moment (operation 403). The controller 220 determines an optical gain according to the attenuation ratio $(1-\gamma)$ at the current time by using a calculation formula or a correspondence table, and controls the optical gain of the optical amplifier 205 (operation 404). If it is not the correction timing (NO in operation 401), the above optical gain is not controlled and the previously set optical gain is maintained.

As described above, the controller 220 controls the optical gain of the optical amplifier 205 according to the attenuation rate $(1-\gamma)$ to amplify the received reference light LO so as to maintain the signal level of the signal output $I_{out}$ within the predetermined range. The controller 220 increases the gain of the optical amplifier 205 relative to the predetermined value as the attenuation rate $(1-\gamma)$ becomes greater and decreases the gain of the optical amplifier 205 relative to the predetermined value as the attenuation rate $(1-\gamma)$ becomes smaller. Such control allows cancelation of change in attenuation rate due to environment to maintain the signal level of the signal output $I_{out}$. In this manner, the optical amplifier 205 amplifies the received reference light LO according to the attenuation rate $(1-\gamma)$, thereby increasing the signal level of the signal output $I_{out}$, which results in the improved SN ratio of the signal output $I_{out}$. Furthermore, the gain of the optical amplifier 14 is controlled according to the attenuation rate $(1-\gamma)$, thereby improving the stability of the signal output $I_{out}$.

It should be noted that the above-mentioned functions of the controller 220 and the attenuation rate calculator 221 may be implemented by executing programs on a computer such as CPU (Central Processing Unit) or processor.

3. Second Example Embodiment

Figure 5:
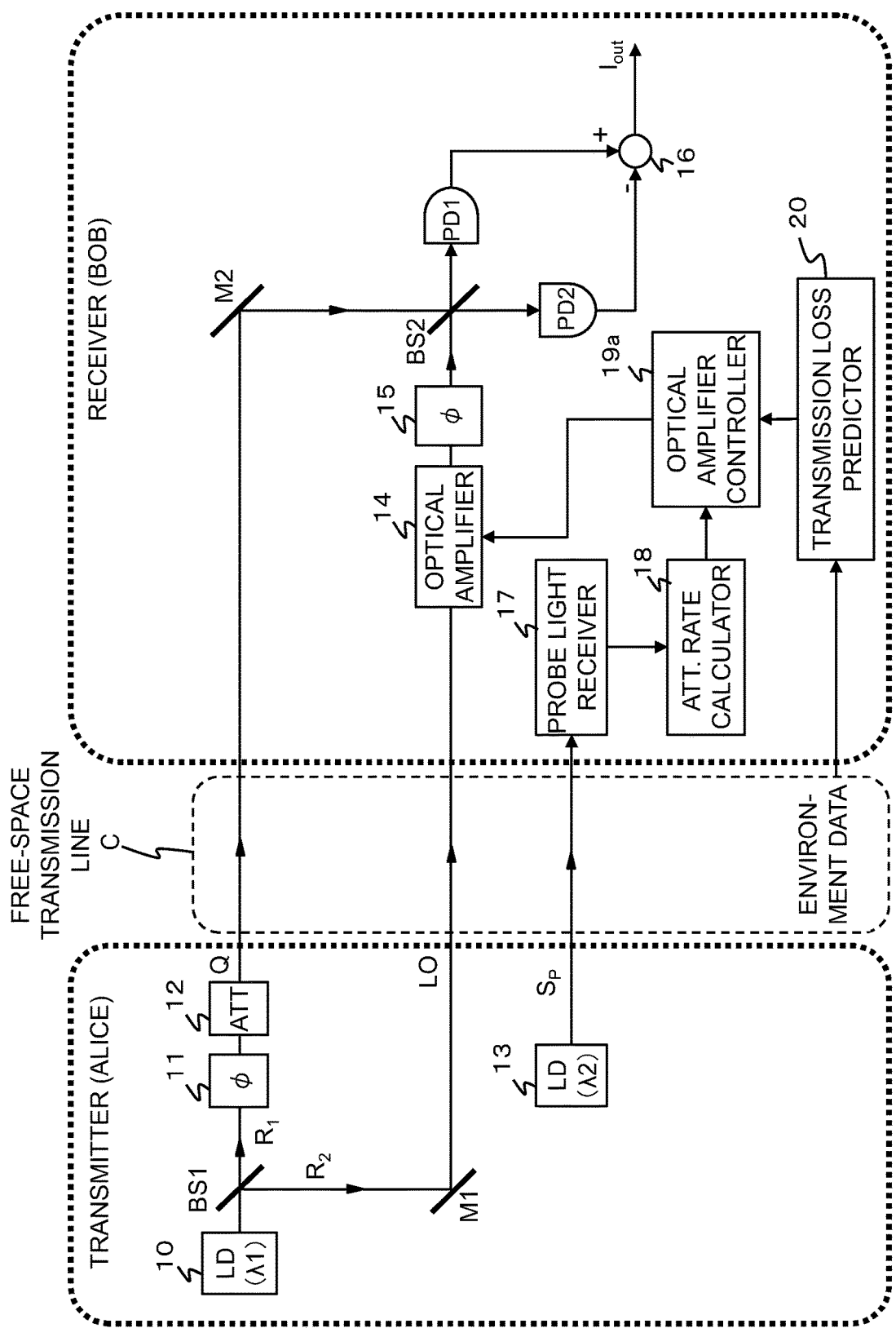
FIG. 5 is a block diagram illustrating the schematic structure of a quantum cryptographic communication system according to a second example embodiment of the present disclosure.

As illustrated in FIG. 5, a system according to a second example embodiment of the present disclosure includes the receiver (Bob) different in configuration from the first example embodiment shown in FIG. 1. Hereinafter, the configuration and functions that differ from those of the first example embodiment will be described. Components similar to those previously described in FIG. 1 will be denoted by the same reference numerals and their details are omitted.

Referring to FIG. 5, the receiver (Bob) includes a transmission loss predictor 20 as a new component, and the configuration other than the transmission loss predictor 20 is similar to the first example embodiment. Accordingly, the control function of an optical amplifier controller 19a is slightly different from that of the optical amplifier controller 19. The transmission loss predictor 20 inputs environmental data and predicts the loss of light propagating through the free-space transmission line C. The optical amplifier controller 19a controls the gain of the optical amplifier 14 using the attenuation rate $(1-\gamma)$ and the transmission loss predicted by the transmission loss predictor 20.

Environmental data includes factors that affect the transmission loss of the free-space transmission line C, such as temperature, humidity, vibration, etc. In addition, time data such as date and time of day may be also included. As is well known, the transmission loss of the free-space transmission line C may vary with temperature and humidity. Since temperature and humidity also vary with the seasons, the date may be used to predict coarse variations in transmission loss. In addition, temperature and humidity vary with time of day, as well as the frequency or magnitude of vibrations caused by traffic and other factors.

Such environmental data that affect the transmission loss of the free-space transmission line C may be measured in advance. Using such measured environmental data, the relationship between environment and transmission loss can be prepared as a conversion table. By referring to this conversion table, the transmission loss predictor 20 can predict the transmission loss of the free-space transmission line C from the current environmental data. Accordingly, the optical amplifier controller 19a can control the optical gain based on the attenuation rate $(1-\gamma)$ actually measured at the present moment and the transmission loss predicted from the environmental data.

As mentioned above, according to the second example embodiment of the invention, the gain of the optical amplifier 14 is controlled based on the predicted transmission loss in addition to the attenuation rate $(1-\gamma)$. This allows further improvements in SN ratio and stability of the signal output $I_{out}$ obtained by homodyne detection.

It should be noted that a specific example of the second example embodiment shown in FIG. 5 is similar to the circuit configuration illustrated in FIGS. 3A and 3B, except that the transmission loss predictor 20 is newly added. Therefore, the detailed example description is omitted.

4. Third Example Embodiment

In a system according to a third example embodiment of the present disclosure, as with the first example embodiment as described above, the receiver (Bob) calculates the attenuation rate $(1-\gamma)$ and controls the optical gain of the received reference light LO according to the attenuation rate $(1-\gamma)$. Further, according to the third example embodiment, the attenuation rate $(1-\gamma)$ is notified to the transmitter (Alice), which modulates the intensity and pulse width of a transmission pulse according to the attenuation rate $(1-\gamma)$.

Hereinafter, by referring to FIGS. 6-9, a detailed description will be made. The different part of the third example embodiment will be mainly described and components having the same functions are denoted by the same reference numerals and their detailed description is omitted.

Figure 6:
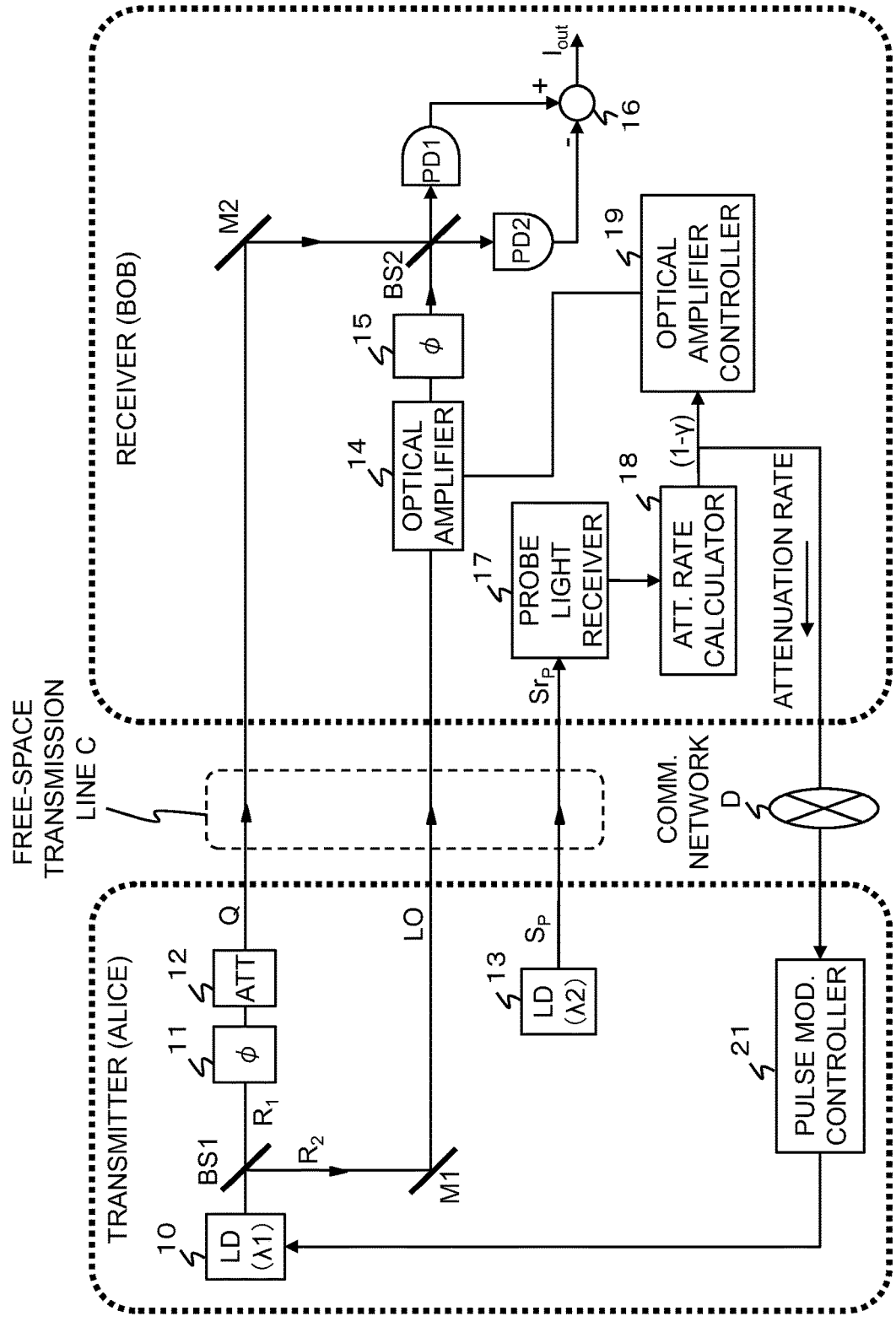
FIG. 6 is a block diagram illustrating the schematic structure of a quantum cryptographic communication system according to a third example embodiment of the present disclosure.

As illustrated in FIG. 6, in the receiver (Bob), the attenuation rate calculator 18 calculates the attenuation rate $(1-\gamma)$. The optical amplifier controller 19 controls the gain of the optical amplifier 14 according to the attenuation rate $(1-\gamma)$. Furthermore, the attenuation rate $(1-\gamma)$ is transmitted to the transmitter (Alice) through the communication network D. The communication network D is an existing telecommunication or optical communication network. Information including the attenuation rate $(1-\gamma)$ may be transferred using packet communication such as the Internet.

The transmitter (Alice) has a pulse modulation controller 21 in addition to the configuration of the first example embodiment. The pulse modulation controller 21 receives the attenuation rate $\gamma$ through the communication network D and modulates the intensity and pulse width of the transmission light pulse emitted by the laser light source 10 according to the attenuation rate $(1-\gamma)$. A control method in the pulse modulation controller 21 will be explained with reference to FIG. 7. In order to simplify the drawing, an optical pulse is hereafter approximated as a rectangular shape, and its peak value is the pulse power (intensity) [W] and its half width is the pulse width [s].

Figure 7:
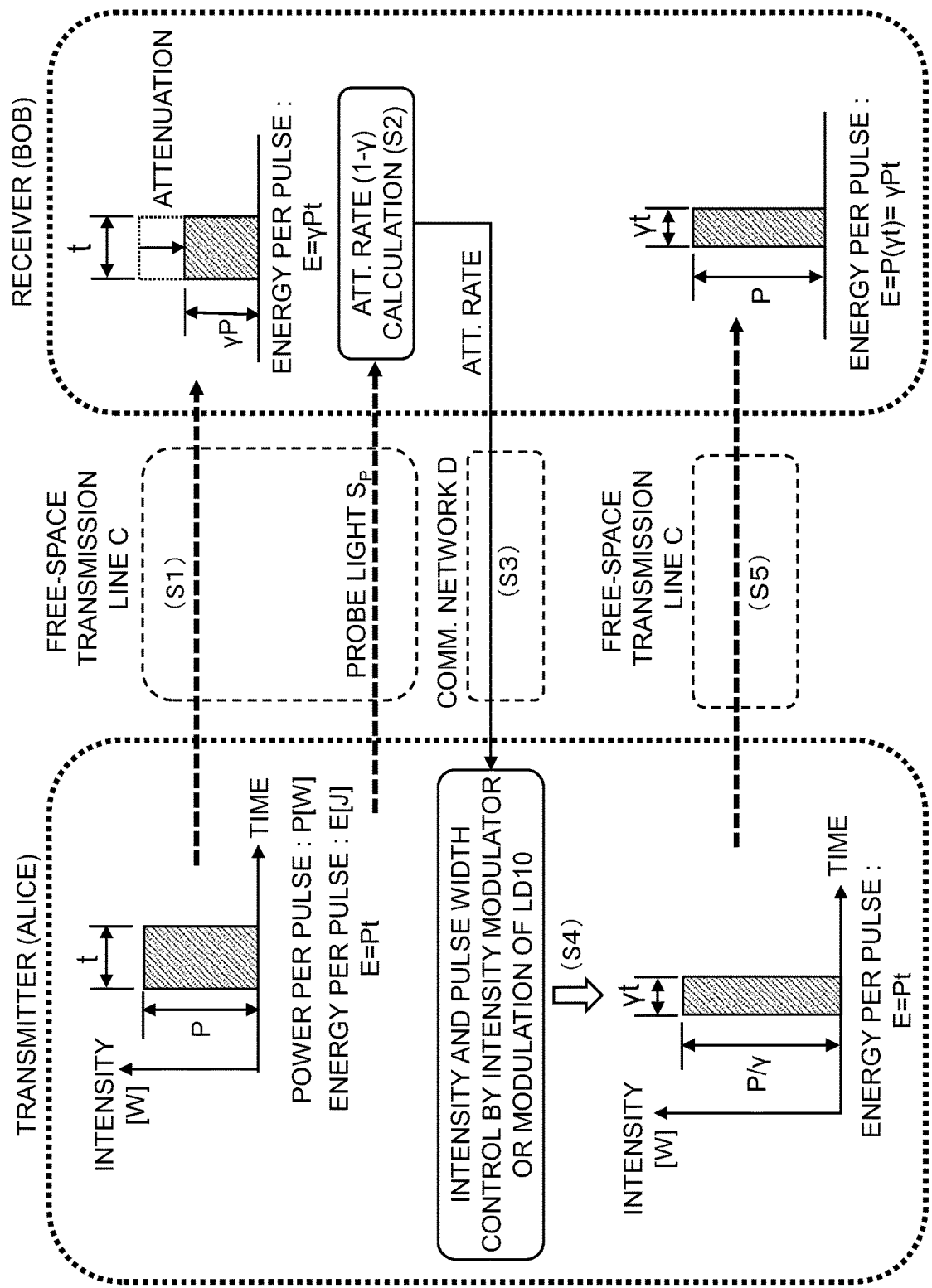
FIG. 7 is a schematic diagram for explaining modulation control of a transmission pulse in the quantum cryptographic communication system according to the third example embodiment of the present disclosure.

In FIG. 7, assuming that the power (intensity) and pulse width of a transmission light pulse sent from the transmitter (Alice) to the free-space transmission line C are $P$[W] and $t$[s], respectively, the energy $E$[J] of the transmission light pulse is $E=Pt$. The transmission light pulse propagates through the free-space transmission line C and reaches the receiver (Bob) (step S1). The light pulse received at the receiver (Bob) has been attenuated in intensity. The attenuation rate at that time can be measured from the probe light $S_p$ as described above (step S2). If the transmittance is $\gamma$ ($0 \leq \gamma \leq 1$), an attenuation rate is expressed as $1-\gamma$ and the energy $E$ of the received light pulse as $E=\gamma Pt$. The attenuation rate $(1-\gamma)$ is sent to the transmitter (Alice) through the communication network D (step S3).

In the transmitter (Alice), the intensity and pulse width of the transmission light pulse are changed according to the attenuation rate $(1-\gamma)$ without changing the energy $E$ per transmission light pulse (step S4). More precisely, the pulse width is shortened from $t$ to $\gamma t$ and the intensity is increased from $P$ to $P/\gamma$. As a result, the energy $E$ per pulse is maintained at $E=Pt$. In this manner, the intensity and pulse width of a transmission light pulse are modulated. The transmission light pulse thus modulated is transmitted to the receiver (Bob) through the free-space transmission line C (step S5). Accordingly, the receiver (Bob) can receive light pulse of intensity $P$ and pulse width $\gamma t$. The energy $E$ per pulse is $E=\gamma Pt$, which is the same as the energy of the received light pulse of step S1.

The above-mentioned pulse modulation can prevent fluctuations of the intensity of received light pulse detected by the photodetectors PD1 and PD2 of the receiver (Bob) and improve the stability along with the SN ratio of the signal output $I_{out}$. Furthermore, since the energy $E$ per pulse does not change when the pulse width and pulse intensity are varied, the pulse modulation according to the present example embodiment can be applied to both reference light LO and signal light Q.

Returning to FIG. 6, in the system according to the third example embodiment, the receiver (Bob) controls the optical gain of the received reference light LO according to the attenuation rate $(1-\gamma)$ to amplify the received reference light LO. The transmitter (Alice) modulates the transmission light pulse to increase its intensity and narrow its pulse width according to the attenuation rate (1−γ). Accordingly, the modulation control at the transmitter (Alice) and the gain control at the receiver (Bob) can maintain the signal output level $L_{out}$ at a threshold value $L_{TH}$ or more in the receiver (Bob), thus improving the SN ratio in homodyne detection at the receiver side. Furthermore, the attenuation rate (1−γ) can be used to maintain the optical signal output level $L_{out}$ within a predetermined range, achieving stabilization of the signal output $I_{out}$.

5. Second Example

The quantum cryptographic communication system according to a second example of the present disclosure has the same configuration as the system shown in FIGS. 3A and 3B except that the attenuation rate (1−γ) is notified to the transmitter (Alice), in which the intensity and pulse width of the transmitted pulses are modulated according to the attenuation rate (1−γ) as described above. Accordingly, the communication device 200 including the receiver (Bob) in the second example has the same configuration as the communication device 200 shown in FIG. 3B except for a communication function to transmit the attenuation factor (1−γ). The communication device 100A including the transmitter (Alice) in the second example has almost the same configuration as the communication device 100 shown in FIG. 3A, but is newly provided with a function to receive the attenuation rate (1−γ) and a function to control the intensity and pulse width of the transmission light pulse according to the attenuation rate (1−γ).

Therefore, a detailed description of the communication device 200 including the receiver (Bob) in the second example is omitted with reference to FIG. 3B. Hereinafter, the configuration and functions of the communication device 100A including the transmitter (Alice) will be mainly described. If necessary, the configuration and functions that differ from those of the first example shown in FIG. 3A will be described. Components similar to those previously described in the first example are denoted by the same reference numerals and their detailed descriptions will be omitted.

Figure 8:
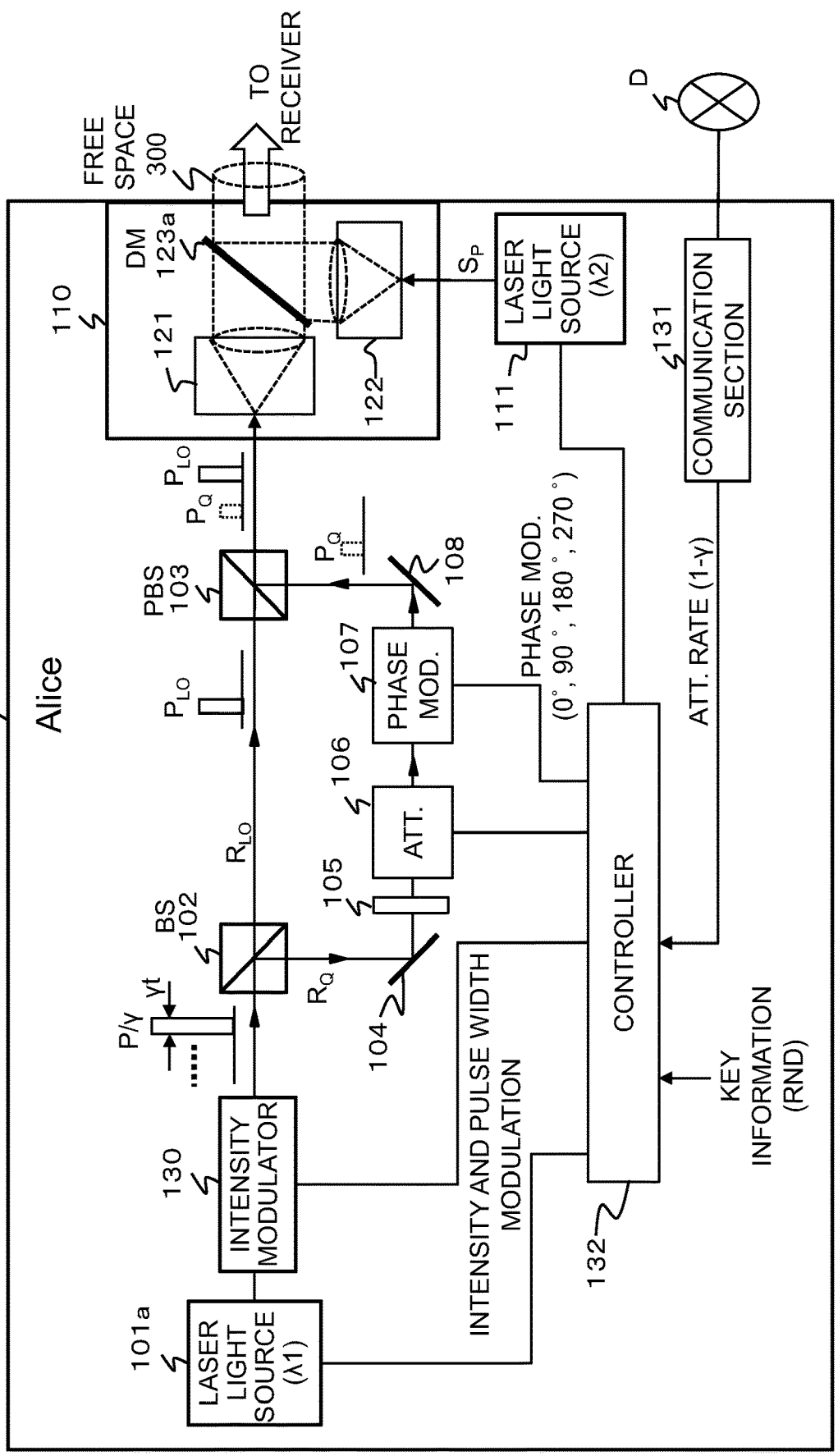
FIG. 8 is a block diagram illustrating the configuration of a transmitter (Alice) in a quantum cryptographic communication system according to a second example of the present disclosure.

Referring to FIG. 8, the transmitter (Alice) of the communication device 100A in the second example includes, as with the first example of FIG. 3A, an optical signal system, an optical probe system, and a transmitter-side optical system 110. The communication device 100A further includes an intensity modulator 130 that performs intensity and pulse width of the transmission light pulse, a communication section 131 that receives the attenuation rate (1−γ), and a controller 132 that performs controls including the intensity and pulse width control. In this example, the laser light source 101a outputs continuous light instead of light pulses.

The intensity modulator 130 is provided between the laser light source 101a and the unpolarizing beam splitter 102. The laser light source 101a outputs a linearly polarized continuous light of wavelength λ1 to the intensity modulator 130 according to the control of the controller 132. The intensity modulator 130 converts the continuous light into light pulses of intensity P/γ and pulse width γt according to the control of the controller 132. For example, a Mach-Zehnder (MZ) modulator may be employed as the intensity modulator 130.

It is possible to replace the laser light source 101a with the laser light source 101 that outputs light pulses as in the first example. In that case, the laser light source 101 is driven by the controller 132 to output a transmission light pulse of intensity P/γ and pulse width γt without the intensity modulator 130.

Hereinafter, the operation of the system according to the present example is described with reference to FIGS. 9 and 10. In the quantum cryptographic communication system according to the second example, cryptographic communication using a quantum cryptographic key is performed between the communication device 100A and the communication device 200 based on predetermined time slots. The communication device 100A is described referring to FIG. 8 and the communication device 200 is described referring to FIG. 3B.

Figure 9:
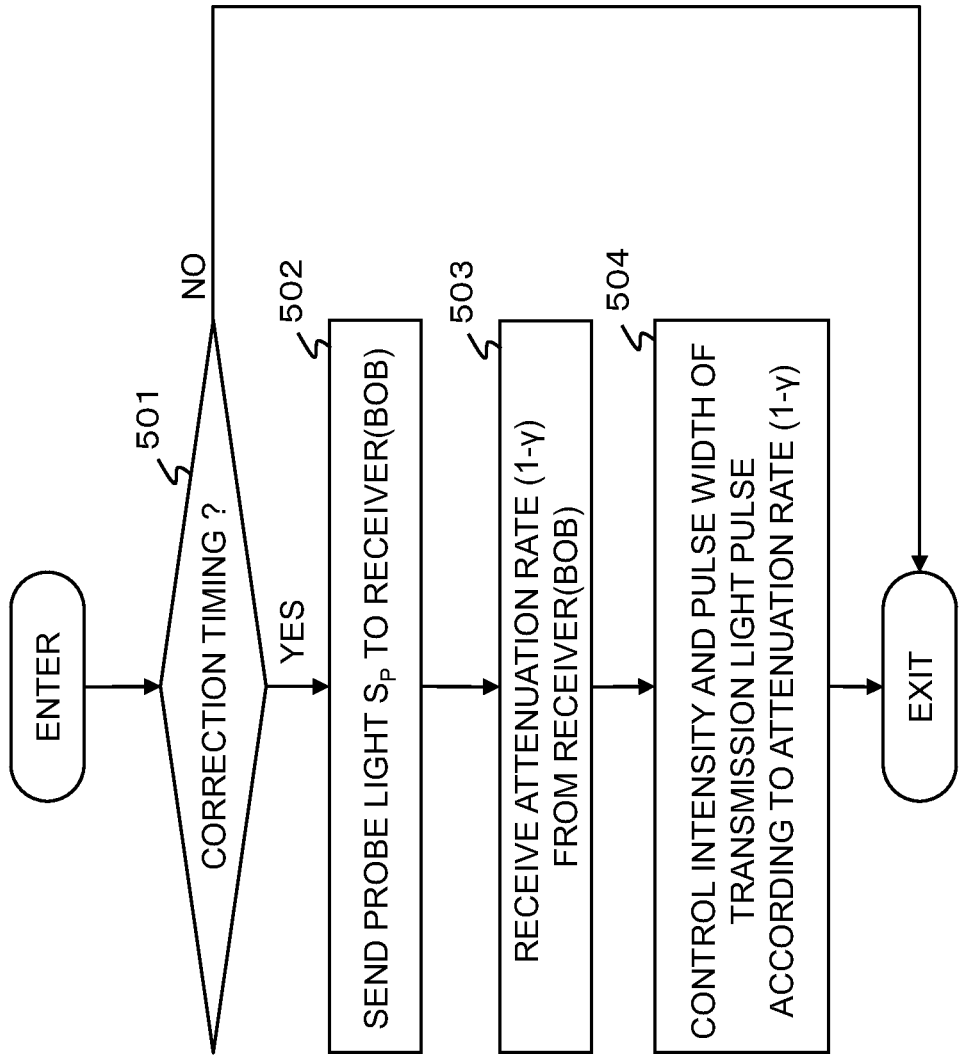
FIG. 9 is a flowchart illustrating the operation of the transmitter (Alice) in the quantum cryptographic communication system according to the second example.

Referring to FIG. 9, the controller 132 of the communication device 100A determines whether or not it is correction timing for each predetermined time slot (operation 501). If it is the correction timing (YES in operation 501), the laser light source 111 is driven to output the probe light $S_p$ to the transmitter-side optical system 110, which sends the probe light $S_p$ to the receiver (Bob) through the free space 300 (operation 502). The receiver (Bob) calculates an attenuation rate (1−γ) based on the received probe light $Sr_p$ as described above.

When receiving information including the attenuation rate (1−γ) from the receiver (Bob) through the communication network D, the communication section 131 outputs the attenuation rate (1−γ) to the controller 132 (operation 503). The controller 132 controls the intensity modulator 130 according to the attenuation rate (1−γ) to perform modulation of the intensity and pulse width of the transmission light pulse (operation 504). If it is not correction timing (NO in operation 501), the above intensity and pulse width control is not performed and the previously set intensity and pulse width are maintained.

As described above, the intensity modulator 130 outputs the transmission light pulse of intensity P/γ and pulse width γt to the unpolarizing beam splitter 102. As described before, from a single light pulse, a reference light pulse $P_{LO}$ of normal intensity and a signal light pulse $P_Q$ phase-modulated are generated as a double pulse of two successive pulses. A train of double pulses is transmitted from the transmitter-side optical system 110 to the communication device 200 through the free space 300.

Referring to FIG. 10, the controller 220 of the communication device 200 determines whether or not it is correction timing for each predetermined time slot (operation 601). If it is the correction timing (YES in operation 601), the photodetector PD3 receives the probe light $Sr_p$ and detects the level of the received probe light $Sr_p$ (operation 602). The attenuation rate calculator 221 inputs the detected level from the photodetector PD3 and calculates the ratio of the detected level to the predetermined transmission level at the time of transmission of the probe light $S_p$ as the attenuation rate (1−γ) at the present moment (operation 603). The controller 220 determines an optical gain according to the attenuation ratio (1−γ) at the current time using a calculation formula or a correspondence table, and controls the optical gain of the optical amplifier 205 (operation 604). Furthermore, the controller 220 sends the attenuation rate (1−γ) to the communication device 100A including the transmitter (Alice) through the communication network D (operation 605). If it is not the correction timing (NO in operation 601), the control of optical gain is not performed and the previously set optical gain is maintained.

As described above, in the system according to the second example, the transmitter (Alice) transmits the probe light $S_p$ to the receiver (Bob) through the free space 300. The receiver (Bob) calculates the attenuation rate (1−γ) and transmits it to the transmitter (Alice). The receiver (Bob) controls the optical gain of the received reference light LO according to the attenuation rate (1−γ). The transmitter (Alice) modulates the intensity and pulse width of the transmission light pulse according to the attenuation rate (1−γ) as described above. Thus, control of the intensity and pulse width at the transmitter (Alice) and control of the gain at the receiver (Bob) allow the signal output level $L_{out}$ at the receiver (Bob) to be maintained at the threshold value $L_{TH}$ or more. Furthermore, the attenuation rate (1−γ) can be used to maintain the optical signal output level $L_{out}$ within a predetermined range.

6. Additional Statements

The present invention may be embodied in other specific forms without departing from the spirit or essential characteristics thereof. The above-described illustrative embodiment and examples are therefore to be considered in all respects as illustrative and not restrictive, the scope of the invention being indicated by the appended claims rather than by the foregoing description, and all changes which come within the meaning and range of equivalency of the claims are therefore intended to be embraced therein. Part or all of the above-described illustrative embodiments can also be described as, but are not limited to, the following additional statements.

Additional Statement 1

A quantum cryptographic communication system comprising a transmitter and a receiver, wherein
the transmitter and the receiver are optically connected to each other through an optical transmission line having propagation characteristics of light varying due to changes of environment,
the transmitter includes:
an optical transmission section configured to generate signal light and reference light from coherent light, and transmit the signal light and the reference light to the optical transmission line, wherein the signal light is weak light having quantum states and the reference light is light having no quantum states; and
a probe light transmitter configured to transmit probe light of a predetermined intensity to the optical transmission line,
the receiver includes:
an optical reception section configured to receive received signal light and received reference light arriving from the transmitter through the optical transmission line;
an optical amplifier that amplifies the received reference light;
a homodyne detector configured to generate a signal output based on the received signal light and the received reference light amplified by the optical amplifier;
a probe light receiver that receives probe light arriving through the optical transmission line; and
an optical amplifier controller configured to calculate an attenuation rate of received probe light to the probe light on transmitter side and control a gain of the optical amplifier according to the attenuation rate.

Additional Statement 2

The quantum cryptographic communication system according to additional statement 1, wherein the probe light transmitter transmits the probe light at predetermined timings, and
the optical amplifier controller calculates the attenuation rate using probe light received at the predetermine timings and controls the gain of the optical amplifier according to the attenuation rate.

Additional Statement 3

The quantum cryptographic communication system according to additional statement 1 or 2, wherein the transmitter further includes a pulse modulation controller that controls intensity and pulse width of the coherent light, wherein the pulse modulation controller receives the attenuation rate from the receiver and controls the intensity and pulse width of the coherent light according to the attenuation rate.

Additional Statement 4

The quantum cryptographic communication system according to additional statement 3, wherein the pulse modulation controller controls such that the intensity is increased from P to Ps/γ and the pulse width is decreased from t to γt, where γ is transmittance of the received probe light to the probe light on transmitter side, the attenuation rate is represented as (1−γ), P and t are intensity and pulse width of the coherent light, respectively.

Additional Statement 5

The quantum cryptographic communication system according to any one of additional statements 1-4, wherein the transmitter includes a transmitter-side optical system shared between the optical transmission section and the probe light transmitter, and the receiver includes a receiver-side optical system shared between the optical reception section and the probe light receiver, wherein the transmitter-side optical system and the receiver-side optical system are provided so that their optical axes are aligned with each other, and wherein the optical transmission line is free space between the transmitter-side optical system and the receiver-side optical system.

Additional Statement 6

A communication device that detects a signal output by homodyne detection in a quantum cryptographic communication system, comprising:
an optical reception section optically connected to a transmitting-side communication device through an optical transmission line having propagation characteristics of light varying due to changes of environment, wherein the optical reception section is configured to receive signal light and reference light arriving from the transmitting-side communication device through the optical transmission line, wherein the signal light is weak light having quantum states and the reference light is light having no quantum states;
an optical amplifier that amplifies received reference light;

a homodyne detector configured to generate the signal output based on received signal light and the received reference light amplified by the optical amplifier;

a probe light receiver that receives probe light arriving from the transmitting-side communication device through the optical transmission line; and an optical amplifier controller configured to calculate an attenuation rate of received probe light to the probe light on transmitting side and control a gain of the optical amplifier according to the attenuation rate.

Additional Statement 7

The communication device according to additional statement 6, wherein the optical amplifier controller calculates the attenuation rate using the received probe light at predetermine timings and controls the gain of the optical amplifier according to the attenuation rate.

Additional Statement 8

The communication device according to additional statement 6 or 7, further comprising a receiving-side optical system shared between the optical reception section and the probe light receiver, wherein an optical axis of the receiving-side optical system is aligned with an optical axis of a transmitting-side optical system provided in the transmitting-side communication device, and wherein the optical transmission line is free space between the transmitting-side optical system and the receiving-side optical system.

Additional Statement 9

A communication control method in a quantum cryptographic communication system including a transmitter and a receiver, wherein the transmitter and the receiver are optically connected to each other through an optical transmission line having propagation characteristics of light varying due to changes of environment, the method comprising:

at the transmitter, by an optical transmission section, generating signal light and reference light from coherent light and transmitting the signal light and the reference light to the optical transmission line, wherein the signal light is weak light having quantum states and the reference light is light having no quantum states; and by a probe light transmitter, transmitting probe light of a predetermined intensity to the optical transmission line, and at the receiver, by an optical reception section, receiving received signal light, received reference light and received probe light arriving from the transmitter through the optical transmission line;

by a controller, calculating an attenuation rate of the received probe light to the probe light on transmitter side and controlling an amplification factor of the received reference light according to the attenuation rate; and by a detector, generating a signal output by homodyne detection based on the received signal light and the received reference light amplified.

Additional Statement 10

The communication control method according to additional statement 9, wherein at the transmitter, the probe light transmitter transmits the probe light at predetermined timings, and at the receiver, the controller calculates the attenuation rate using the received probe light at the predetermine timings and controls the amplification factor according to the attenuation rate.

Additional Statement 11

The communication control method according to additional statement 9 or 10, further comprising:

at the transmitter, by a pulse modulation controller, receiving the attenuation rate from the receiver and controlling the intensity and pulse width of the coherent light according to the attenuation rate.

Additional Statement 12

The communication control method according to additional statement 9 or 10, wherein the transmitter includes a transmitter-side optical system shared between the optical transmission section and the probe light transmitter, and the receiver includes a receiver-side optical system shared between the optical reception section and the probe light receiver, wherein the transmitter-side optical system and the receiver-side optical system are provided so that their optical axes are aligned with each other, and wherein the optical transmission line is free space between the transmitter-side optical system and the receiver-side optical system.

Additional Statement 13

A communication control method of a receiver in a quantum cryptographic communication system including a transmitter and the receiver, wherein the receiver is optically connected to the transmitter through an optical transmission line having propagation characteristics of light varying due to changes of environment, the method comprising:

by an optical reception section, receiving signal light, reference light and probe light arriving from the transmitter through the optical transmission line, wherein the signal light is weak light having quantum states and the reference light is light having no quantum states;

by a controller, calculating an attenuation rate of received probe light to the probe light on transmitter side and controlling an amplification factor of received reference light according to the attenuation rate; and by a detector, generating a signal output by homodyne detection based on the received signal light and the received reference light amplified at the amplification factor.

Additional Statement 14

The communication control method according to additional statement 13, wherein by the controller, the attenuation rate is calculated using the received probe light at predetermined timings, and the amplification factor is controlled according to the attenuation rate.

Additional Statement 15

A program functioning a computer as a communication device that detects a signal output by homodyne detection in a quantum cryptographic communication system, comprising instructions to:
  by an optical reception section, receive signal light and reference light arriving from a transmitting-side communication device through an optical transmission line having propagation characteristics of light varying due to changes of environment, wherein the optical reception section is optically connected to the transmitting-side communication device through the optical transmission line, wherein the signal light is weak light having quantum states and the reference light is light having no quantum states;
  by an optical amplifier, amplify received reference light;
  by a homodyne detector, generate the signal output based on received signal light and the received reference light amplified by the optical amplifier;
  by a probe light receiver, receive probe light arriving from the transmitting-side communication device through the optical transmission line; and
  by an optical amplifier controller, calculate an attenuation rate of received probe light to the probe light on transmitting side and control a gain of the optical amplifier according to the attenuation rate.

The present invention is applicable to quantum key distribution (QKD) systems.

The invention claimed is:

1. A communication device that detects a signal output by homodyne detection in a quantum cryptographic communication system, comprising:
  an optical reception section configured to receive signal light and reference light arriving from a transmitting-side communication device through an optical transmission line, wherein the optical transmission line has propagation characteristics of light varying due to changes of environment, wherein the signal light is weak light having quantum states and the reference light is light having no quantum states;
  an optical amplifier that amplifies received reference light;
  a homodyne detector configured to generate the signal output based on received signal light and the received reference light amplified by the optical amplifier;
  a probe light receiver that receives probe light arriving from the transmitting-side communication device through the optical transmission line; and
  a controller configured to: calculate a transmission line state detected based on received probe light; and control a gain of the optical amplifier according to the transmission line state.

2. The communication device according to claim 1, wherein the probe light receiver receives probe light at predetermine timings,
  wherein the controller calculates the transmission line state based on the received probe light at the predetermine timings.

3. The communication device according to claim 1, wherein the controller calculates the transmission line state based on intensity ratio of the received probe light to the probe light on transmitting side.

4. The communication device according to claim 3, wherein the controller calculates the transmission line state based on the intensity ratio and environmental data.

5. The communication device according to claim 1, further comprising a receiving-side optical system shared between the optical reception section and the probe light receiver, wherein an optical axis of the receiving-side optical system is aligned with an optical axis of a transmitting-side optical system provided in the transmitting-side communication device, and wherein the optical transmission line is free space between the transmitting-side optical system and the receiver-side optical system.

6. A communication control method of a receiver in a quantum cryptographic communication system including a transmitter and the receiver which are optically connected to the transmitter through an optical transmission line having propagation characteristics of light varying due to changes of environment,
  the method comprising:
  by an optical reception section, receiving signal light, reference light and probe light arriving from the transmitter through the optical transmission line, wherein the signal light is weak light having quantum states and the reference light is light having no quantum states;
  by a controller, calculating a transmission line state detected based on received probe light and controlling an amplification factor of received reference light according to the transmission line state; and
  by a detector, detecting a signal output by homodyne detection based on the received signal light and the received reference light amplified at the amplification factor.

7. The communication control method according to claim 6, wherein by the controller, the transmission line state is calculated using the received probe light at predetermined timings.

8. The communication control method according to claim 6, wherein by the controller, the transmission line state is calculated based on intensity ratio of the received probe light to the probe light on transmitting side.

9. The communication control method according to claim 8, wherein by the controller, the transmission line state is calculated based on the intensity ratio and environmental data.

10. A quantum cryptographic communication system comprising a transmitter and a receiver, wherein
  the transmitter and the receiver are optically connected to each other through an optical transmission line having propagation characteristics of light varying due to changes of environment,
  the transmitter includes:
    an optical transmission section configured to generate signal light and reference light from coherent light, and transmit the signal light and the reference light to the optical transmission line, wherein the signal light is weak light having quantum states and the reference light is light having no quantum states; and
    a probe light transmitter configured to transmit probe light of a predetermined intensity to the optical transmission line,
  the receiver includes:
    an optical reception section configured to receive received signal light and received reference light arriving from the transmitter through the optical transmission line;
    an optical amplifier that amplifies the received reference light;

a homodyne detector configured to generate a signal output based on the received signal light and the received reference light amplified by the optical amplifier;

a probe light receiver that receives probe light arriving through the optical transmission line; and a controller configured to: calculate a transmission line state detected based on received probe light; and control a gain of the optical amplifier according to the transmission line state.

11. The quantum cryptographic communication system according to claim 10, wherein the probe light transmitter transmits the probe light at predetermined timings, and the controller is configured to calculate the transmission line state detected based on the probe light received at the predetermine timings.

12. The quantum cryptographic communication system according to claim 10, wherein the controller is configured to calculate the transmission line state based on intensity ratio of the received probe light to the probe light on transmitting side.

13. The quantum cryptographic communication system according to claim 12, wherein the controller is configured to calculate the transmission line state based on the intensity ratio and environmental data.

14. The quantum cryptographic communication system according to claim 10, wherein the transmitter further includes a pulse modulation controller that controls intensity and pulse width of the coherent light, wherein the pulse modulation controller receives the transmission line state from the receiver and controls the intensity and pulse width of the coherent light according to the transmission line state.

15. The quantum cryptographic communication system according to claim 14, wherein the pulse modulation controller controls such that the intensity is increased from P to P$s/\gamma$ and the pulse width is decreased from t to $\gamma$t, where $\gamma$ is transmittance of the received probe light to the probe light on transmitter side, P and t are intensity and pulse width of the coherent light, respectively wherein the transmission line state is represented as $\gamma$ or $(1-\gamma)$.

16. The quantum cryptographic communication system according to claim 10, wherein the transmitter includes a transmitter-side optical system shared between the optical transmission section and the probe light transmitter, and the receiver includes a receiver-side optical system shared between the optical reception section and the probe light receiver, wherein the transmitter-side optical system and the receiver-side optical system are provided so that their optical axes are aligned with each other, and wherein the optical transmission line is free space between the transmitter-side optical system and the receiver-side optical system.

* * * * *